US 6,953,273 B2

(12) United States Patent
Nakajima et al.

(10) Patent No.: US 6,953,273 B2
(45) Date of Patent: Oct. 11, 2005

(54) VEHICLE LAMP

(75) Inventors: Tetsuya Nakajima, Tokyo (JP); Atsushi Kochi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 137 days.

(21) Appl. No.: 10/618,421

(22) Filed: Jul. 11, 2003

(65) Prior Publication Data

US 2004/0008521 A1 Jan. 15, 2004

(30) Foreign Application Priority Data

Jul. 15, 2002 (JP) .............................. 2002-205416

(51) Int. Cl.[7] .................................................. F21V 7/00
(52) U.S. Cl. ...................... 362/517; 362/521; 362/522; 362/543; 362/544; 362/546
(58) Field of Search ............................... 362/517, 543, 362/544, 546, 521, 522

(56) References Cited

U.S. PATENT DOCUMENTS

| 5,158,350 A | * | 10/1992 | Sato ........................... 362/538 |
| 5,172,972 A | * | 12/1992 | Terao .......................... 362/517 |
| 6,045,247 A | * | 4/2000 | Fukuhara ..................... 362/543 |
| 6,270,241 B1 | * | 8/2001 | Collot et al. ................. 362/544 |
| 6,505,962 B2 | * | 1/2003 | Gotou ......................... 362/517 |
| 2003/0227781 A1 | * | 12/2003 | Mochizuki .................. 362/517 |

* cited by examiner

*Primary Examiner*—Thomas M. Sember
*Assistant Examiner*—James W Cranson, Jr.
(74) *Attorney, Agent, or Firm*—Darby & Darby

(57) ABSTRACT

A vehicle lamp has first and second lamp chamber portions each including: a light source; a casing having opening and portion for reflecting light emitted from the light source; and lens portion for closing the opening of the casing; the first and second lamp chamber portions each forming lamp chamber partitioned with the casing and the lens portion, wherein the lens portion of the first lamp chamber portion passes light through substantially forward or backward from a vehicle; at least a part of the second lamp chamber portion is disposed within the lamp chamber of the first lamp chamber portion; and the second lamp chamber portion overlaps with the light source of the first lamp chamber portion in the substantially longitudinal direction.

15 Claims, 4 Drawing Sheets

VEHICLE LAMP

BACKGROUND OF THE INVENTION

1. Field of the Invention

The present invention relates to a vehicle lamp comprising a plurality of lamp chambers respectively having light sources, particularly to a headlight structure with reflecting member for changing directions of light beams.

2. Description of the Related Art

There are known vehicle lamps fixing in front of automotive vehicles and having low- and high-beam functions of emitting light forward from the vehicle, turnsignal functions of indicating right and left turns and clearance functions of informing vehicle width likewise. The vehicle lamp is a so-called a headlight and supplied with a low-beam lamp chamber portion, a high-beam lamp chamber portion, a turnsignal lamp chamber portion and a clearance lamp chamber portion which are independently provided. Each lamp chamber portion has a light source, a casing for reflecting a light emitted from the light source, and a lens portion for forming a lamp chamber section together with the casing. The casing is formed with an open front portion, a convex rear portion and the opening of the casing is substantially closed with the lens portion. The lamp chamber portion is so arranged that these portions are prevented from optically interfering with each other, that a sufficient luminous area is secured for each of them and that these portions are also prevented from overlapping each other as seen from the front side of the vehicle.

Moreover, such a vehicle lamp employs an electric bulb as a light source. In case that the bulb is directly visible from the outside of the vehicle, it does not have good external appearance. Therefore, a shade as a shielding member for covering each bulb is disposed within the lamp chamber of the vehicle lamp. In other words, the bulb is not visible by pedestrians because the bulb in the vehicle lamp is covered with the shielding member, so that a good external appearance is obtained.

However, as the lamp chamber is so arranged that the light emitting (longitudinal) direction is prevented from overlapping each other, there develops a problem arising from causing the vehicle lamp as a whole to become large. Consequently, the projection area of the vehicle increases as the projection area in the light emitting direction also increases, without saying that the design freedom of the vehicle is limited, which results in making it inconvenient designing the vehicle from an aerodynamic standpoint. Further, because a portion corresponding to the shielding member in the lens portion does not function sufficiently as a luminous portion, the light emitting efficiency lowers and the problem is that the whole lens portion is not effectively used.

SUMMARY OF THE INVENTION

An object of the present invention made in view of the situation above is to provide a vehicle lamp designed so that its size is reduced but a luminous area of each lamp chamber is so effectively secured that the whole lens portion is fully utilized.

In order to accomplish the object above, the vehicle lamp according to the present invention as described in a first aspect, comprises first and second lamp chamber portions each including: a light source; a casing with an opening for reflecting a light emitted from a light source; and a lens portion for closing the opening; the first and second lamp chamber portions each forming a lamp chamber partitioned with the case and the lens portion, wherein the lens portion of the first lamp chamber portion passes a light through forwardly or backwardly from a vehicle; at least a part of the second lamp chamber portion disposed within the lamp chamber of the first lamp chamber portion; and the second lamp chamber portion overlapped with the light source of the first lamp chamber portion in the substantially longitudinal direction.

According to the present invention as described in the first aspect, the space required for both the first and second lamp chamber portions can be made smaller than the space required for the first and second lamp chamber portions that are installed independently of each other by disposing the part of the second lamp chamber portion within the first lamp chamber portion.

When the light source of the first lamp chamber portion is switched ON with the light source of the second lamp chamber portion being in the OFF state, a small amount of the light emitted from the light source of the first lamp chamber portion is obstructed by the second lamp chamber portion and no light is directly incident on the projection part of the second lamp chamber portion in the lens portion of the first lamp chamber portion. As the light is reflected by the casing of the first lamp chamber portion into the lamp chamber, the reflected light is incident on the projection part. In other words, the light is incident on the whole lens portion of the first lamp chamber portion and the luminous condition of the whole lens portion of the first lamp chamber portion is visible from the outside of the vehicle.

When the light source of the second lamp chamber portion is switched ON with the light source of the first lamp chamber portion being in the OFF state, the light is incident on the lens portion of the second lamp chamber portion, whereby the luminous condition of the lens portion of the second lamp chamber portion is visible from the outside of the vehicle via the lens portion of the first lamp chamber portion.

When the light source of the first lamp chamber portion and the light source of the second lamp chamber portion are switched ON, the whole lens portion of the first lamp chamber portion is made luminous by the light of the light source of the first lamp chamber portion and the lens portion of the second lamp chamber portion is also made luminous by the light of the light source of the second lamp chamber portion. Thus, the luminous condition of the lens portion of the second lamp chamber portion is visible from the outside of the vehicle via the lens portion of the first lamp chamber portion.

As the second lamp chamber portion is overlapped with the light source of the first lamp chamber portion, the light source of the first lamp chamber portion remains invisible from the front or rear of the vehicle. In other words, the second lamp chamber portion functions as not only a lamp chamber but also what covers the light source of the first lamp chamber portion.

It is feasible to reduce the size of the vehicle lamp as a whole by decreasing the space required for the first lamp chamber portion and the second lamp chamber portion with the luminous area of the first lamp chamber portion and that of the clearance lamp chamber portion secured. Consequently, the projection area of the vehicle decreases as the projection areas in the light emitting directions decrease, and improving the freedom of shaping the vehicle, which results in making it convenient to shape up the vehicle from an aerodynamic standpoint.

The luminous condition of the lens portion of the second lamp chamber portion is visible via the lens portion of the turnsignal lamp chamber portion when the light source of the first lamp chamber portion and the light source of the second lamp chamber portion turn luminous. Accordingly, it is possible to give the vehicle an esthetic shape which does not exist in the conventional vehicle lamp.

The light source of the first lamp chamber portion is substantially covered by the second lamp chamber portion whereby not only making the external appearance of the vehicle lamp favorable but also improving the sale value. The covering member of the light source of the first lamp chamber portion can be omitted, which results in decreasing the number of parts. As the portion corresponding to the second lamp chamber portion in the lens portion of the first lamp chamber portion is easily utilized as the luminous portion of the second lamp chamber portion, the whole lens portion of the first lamp chamber portion is also effectively utilized.

According to the present invention as described in a second aspect, a surface treatment for reflecting the light is applied on an exterior surface of the second lamp chamber portion facing to the light source of the first lamp chamber portion in the vehicle lamp as described in the first aspect.

According to the present invention as described in the second aspect in addition to the function in the first aspect, the light emitted from the light source toward the exterior surface of the second lamp chamber portion is reflected in the first lamp chamber portion. In other words, the light emitted from the light source is never absorbed into the exterior surface of the second lamp chamber portion like the second lamp chamber portion of which exterior surface is not subjected to such a surface treatment.

The exterior surface of the second lamp chamber portion is to be reflected in the casing of the first lamp chamber portion with the first lamp chamber portion being put OFF state; however, as the exterior surface of the second lamp chamber portion is subjected to the surface treatment, the casing of the first lamp chamber portion is reflected therein. More specifically, the exterior surface of the second lamp chamber portion with the casing of the first lamp chamber portion reflected in the exterior surface thereof is reflected in the casing of the first lamp chamber portion, so that the inside of the casing of the first lamp chamber portion takes on an integral hue because the second lamp chamber portion is not clearly visible from the outside of the vehicle.

Therefore, the light emitting efficiency of the lens portion of the first lamp chamber portion is prevented from being lowered because the light in the lamp chamber of the first lamp chamber portion is absorbed by the second lamp chamber portion, so that the light emitted from the light source of the first lamp chamber portion is effectively utilized. The shadow of the second lamp chamber portion is not projected on the lens portion of the first lamp chamber portion when the light source of the first lamp chamber portion is switched ON. Consequently, the lens portion of the first lamp chamber portion can be made luminous with substantially uniform luminosity and the second lamp chamber portion is not projected on the casing of the first lamp chamber portion when the light source of the first lamp chamber portion is switched OFF. The appearance of the vehicle lamp can thus be improved while the light source of the first lamp chamber portion is in the on and OFF states.

According to the present invention as described in a third aspect, the casing of the second lamp chamber portion is formed of a half-mirror in the vehicle lamp as described in the first aspect.

According to the present invention as described in the third aspect in addition to the function in the first aspect, the half-mirror reflects the light within the second lamp chamber portion and passes through the light which is incident from the first lamp chamber portion. Thus, the light emitted from the light source of the first lamp chamber portion is not impeded (or obstructed) by the exterior surface of the casing like the second lamp chamber portion of which casing is not formed of the half-mirror.

Therefore, the light emitting efficiency of the lens portion of the first lamp chamber portion is prevented from being lowered because the light in the lamp chamber of the first lamp chamber portion is absorbed by the second lamp chamber portion, so that the light emitted from the light source of the first lamp chamber portion is effectively utilized. In other words, the lens portion of the first lamp chamber portion can be made luminous with the substantially uniform luminosity and the appearance of the vehicle lamp can thus be improved while the light source of the first lamp chamber portion is in the ON state.

According to the present invention as described in a fourth aspect, the lens portion of the first lamp chamber portion is formed of a clear lens; and at least a part of the lens portion of the second lamp chamber portion is formed of a diffusion lens for diffusing light within the lamp chamber of the second lamp chamber portion in the vehicle lamp as described in one of the first to third aspects.

According to the present invention as set forth in the fourth aspect in addition to the function in one of the first to third aspects, as the lens portion of the first lamp chamber portion is formed with the clear lens, the luminous condition of the lens portion of the second lamp chamber portion is clearly visible from the outside of the vehicle via the lens portion of the first lamp chamber portion. Since at least the part of the lens portion of the second lamp chamber portion is formed with the diffusion lens, the irradiation range of the lens portion is relatively wide to ensure that the luminous condition of the lens portion of the second lamp chamber portion is visible from the outside of the vehicle.

When the light source of the second lamp chamber portion is switched ON, the second lamp chamber portion becomes visible clearly and currently from the outside of the vehicle. In other words, even when the light source of the first lamp chamber portion and that of the second lamp chamber portion are switched ON with the lens portion of the first lamp chamber portion turned luminous, the luminous condition of the lens portion of the second lamp chamber portion becomes visible clearly and correctly.

According to the present invention as described in a fifth aspect, a protruded shielding portion for obstructing a direct incidence of the light emitted from the light source of the first lamp chamber portion on the lens portion of the second lamp chamber portion is formed on the exterior surface of the second lamp chamber portion in the vehicle lamp as described in one of the first to fourth aspects.

According to the present invention as described in the fifth aspect in addition to the function in one of the first to fourth aspects, of the light emitted from the light source of the first lamp chamber portion, the light emitted toward the lens portion of the second lamp chamber portion is blocked by each of the projected shielding portions from being incident on the lens portion.

Therefore, the light of the light source of the first lamp chamber portion is not directly incident on the lens portion of the second lamp chamber portion, whereby the lens portion of the second lamp chamber portion is prevented from turning luminous when the light source of the first lamp chamber portion is switched ON. In other words, the lens portion of the second lamp chamber portion is prevented from turning luminous when the light source of the first lamp chamber portion is switched ON and the luminous condition of the lens portion of the first lamp chamber portion and that of the lens portion of the second lamp chamber portion are clearly distinguished from each other and also made visible accordingly.

According to the present invention as described in a sixth aspect, a slit for guiding the light emitted from the light source of the first lamp chamber portion to the part of the lens portion of the second lamp chamber portion is formed in the casing of the second lamp chamber portion in the vehicle lamp as described in one of the first to fifth aspects.

According to the present invention as described in the sixth aspect in addition to the function in one of the first to fifth aspects, when the light source of the first lamp chamber portion is switched ON, the light emitted from the light source is incident on the part of the lens portion of the second lamp chamber portion through each of the slits. While the light source of the first lamp chamber portion is in the ON state, the part of the lens portion of the second lamp chamber portion together with the lens portion of the first lamp chamber portion turns luminous.

Thus, when the light source of the second lamp chamber portion is switched ON with the first lamp chamber portion being in the OFF state, the whole lens portion of the second lamp chamber portion is made luminous by the light of the light source. When the light source of the first lamp chamber portion is switched ON with the second lamp chamber portion being in the OFF state. The whole lens portion of the first lamp chamber portion and the part of the lens portion of the second lamp chamber portion are made luminous by the light of the light source. Further, when the light source of the first lamp chamber portion and the light source of the second lamp chamber portion are simultaneously switched ON, the whole lens portion of the first lamp chamber portion and the part of the lens portion of the second lamp chamber portion are made luminous by the light source of the first lamp chamber portion, whereas the other part of the lens portion of the second lamp chamber portion is made luminous by the light source of the second lamp chamber portion.

When the first lamp chamber portion is switched ON with the second lamp chamber portion being in the OFF state, and on the other hand, the whole lens portion of the lamp chamber portion on one side turns luminous, whereby the utilization of the luminous areas of both the lens portions are maximized and the visibility of each lens portion can be improved. When both the lamp chamber portions are in the ON state simultaneously, the part of the lens portion of the second lamp chamber portion is made luminous by the light source of the first lamp chamber portion. Consequently, the luminous condition of the second lamp chamber portion becomes different from the luminous condition, when only the second lamp chamber portion is brought into the ON state, which results in a noticeable condition, so that the visibility is improved further. As the second lamp chamber portion becomes different luminous conditions in accordance with the luminous condition of the first lamp chamber portion, the design freedom of shaping the vehicle is noticeably improved and adds the sales value.

If the luminous portion of the lens portion of the first lamp chamber portion is divided, it is possible for the lens portion of the second lamp chamber portion is provided to turn ON the divided luminous portions of the lens portion of the first lamp chamber portion to be coupled together by turn ON the first lamp chamber portion.

According to the present invention as described in a seventh aspect, the second lamp chamber portion is disposed so as to cross over the inside of the lamp chamber of the first lamp chamber portion in the vehicle lamp as described in one of the first to sixth aspects.

According to the present invention as described in the seventh aspect, in addition to the function in one of the first to sixth aspects, the second lamp chamber portion is securely supported at each outside end of the lamp chamber of the second lamp chamber portion. As the second lamp chamber portion is supported at one end of the second lamp chamber portion within the first lamp chamber portion, the second lamp chamber portion is not left in an unstable condition.

Therefore, no load is applied repeatedly to the parts of supporting the second chamber portion even though the second lamp chamber portion is excessively vibrated during running condition of the vehicle, so that the reliability and durability of the second lamp chamber portion can be improved. Accordingly, the second lamp chamber portion is set free from deformations when used for a long time to ensure that the light source of the first lamp chamber portion is securely covered up.

DETAILED DESCRIPTION OF THE PREFERRED EMBODIMENTS

Figure 1:
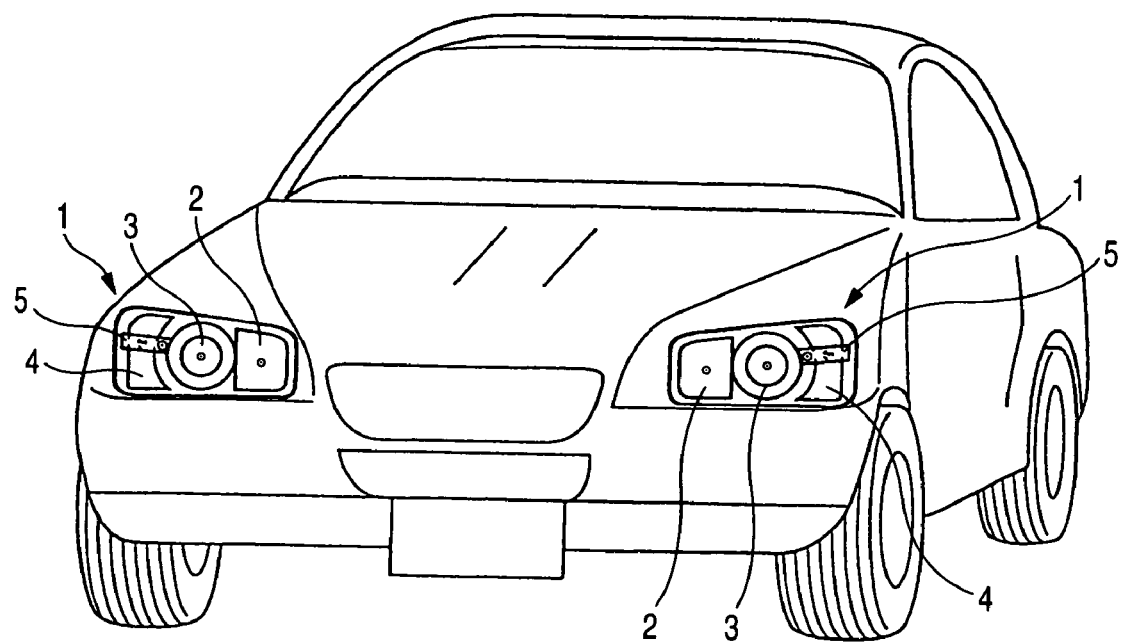
FIG. 1 is a diagram showing an embodiment of the present invention; a perspective external view of an automotive vehicle with vehicle lamps fixed to the automotive vehicle.
Figure 2:
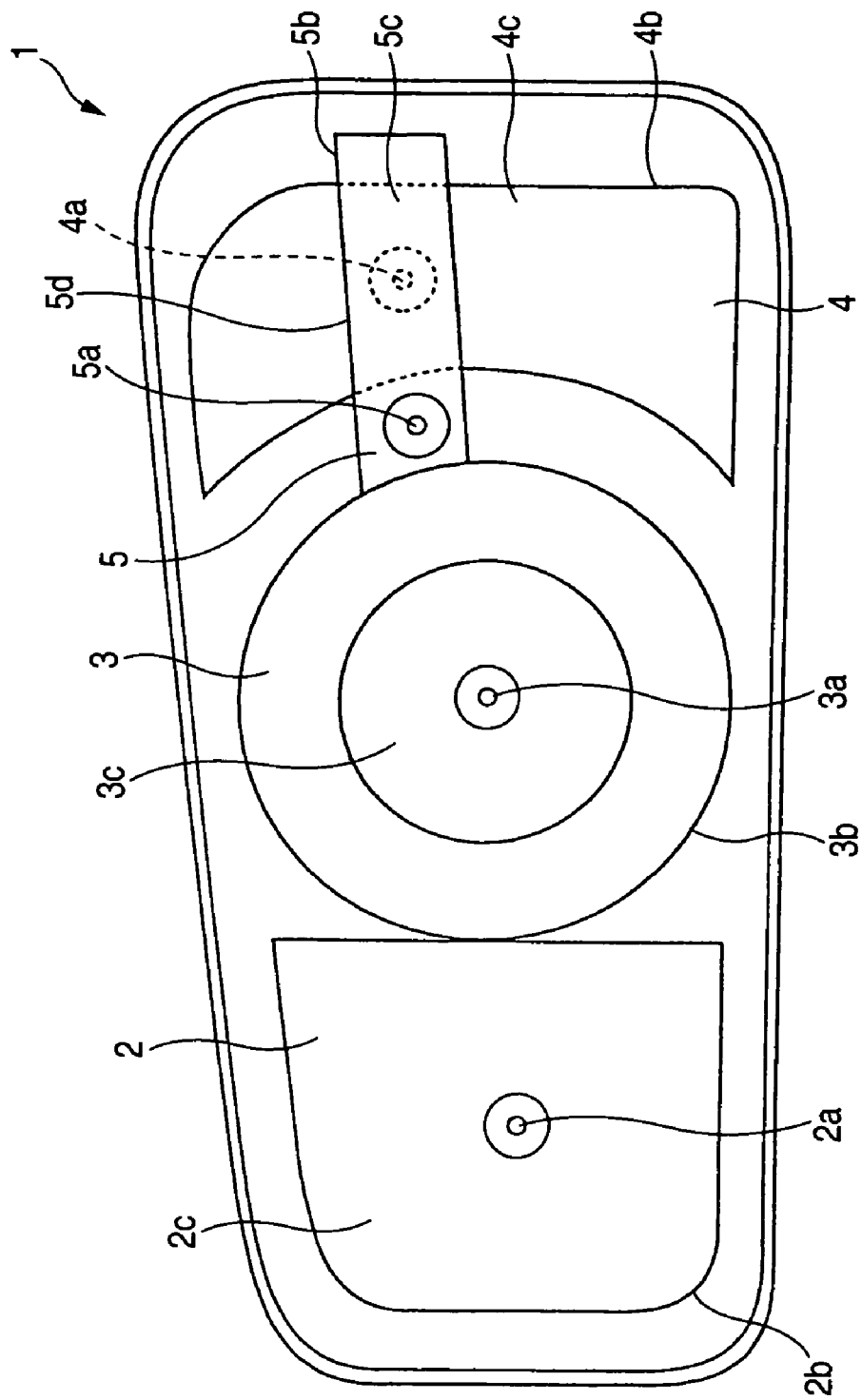
FIG. 2 is an elevational view of the vehicle lamp.
Figure 3:
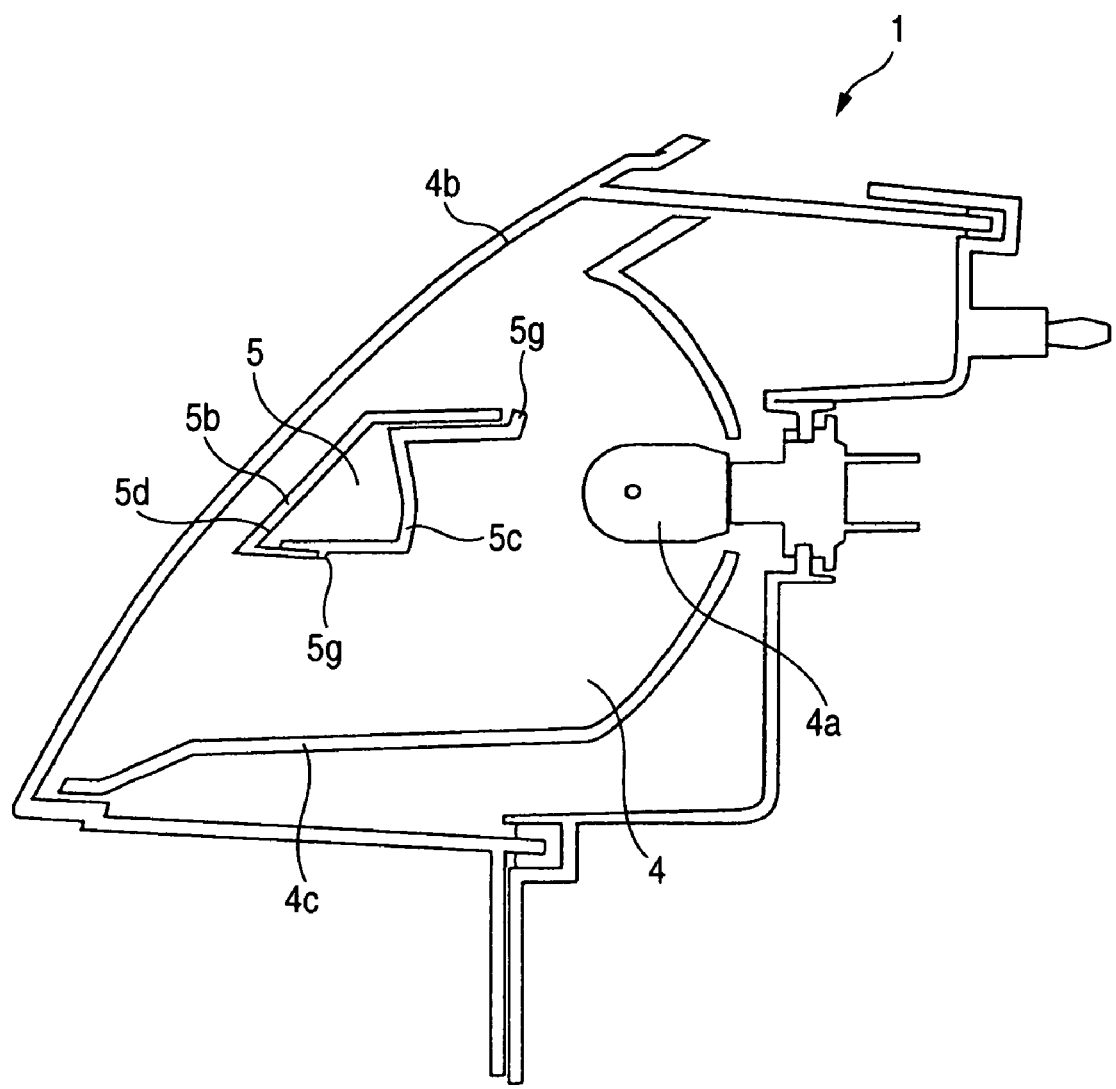
FIG. 3 is a side sectional view of the vehicle lamp.

FIGS. 1 to 4 show an embodiment of the present invention: FIG. 1 is a perspective external view of an automotive vehicle with vehicle lamps fixed to the automotive vehicle; FIG. 2, an elevational view of the vehicle lamp; FIG. 3, a side sectional view of the vehicle lamp; and FIG. 4, a sectional view of the top surface of the vehicle lamp.

A vehicle lamp 1 is a so-called headlight and as shown in FIG. 1 provided on both sides of the front end of an automobile in bilateral symmetry. The vehicle lamp 1 is fitted with a plurality of lamp chamber portions 2, 3, 4 and 5 with bulbs 2a, 3a, 4a and 5a as light sources disposed on the back sides of the respective lamp chamber portions. The lamp portions 2, 3, 4 and 5 are formed into sections of lens portions 2b, 3b, 4b and 5b and rear-side casings 2c, 3c, 4c and 5c. The lens portions 2b, 3b, 4b and 5b are made of plastics and used for passing an incident light substantially forward therethrough. Each of the casings 2c, 3c, 4c and 5c is furnished with a reflective portion where the incident light is reflected therefrom and made of plastics with aluminum deposited thereon.

More specifically, the light emitted from the bulbs 2a, 3a, 4a and 5a toward the lens portions 2b, 3b, 4b and 5b proceeds forward from the lamp chamber portions 2, 3, 4 and 5 via the lens portions 2b, 3b, 4b and 5b of the vehicle. And further, the light emitted toward the casings 2c, 3c, 4c and 5c and reflected in the lamp chamber portions 2, 3, 4 and 5 then proceeds forward from the lamp chamber portions 2, 3, 4 and 5 via the lens portions 2b, 3b, 4b and 5b of the vehicle. Then the lens portions 2b, 3b, 4b and 5b turn luminous when the bulbs 2a, 3a, 4a and 5a of the lamp chamber portions 2, 3, 4 and 5 are switched ON, so that the light is forwardly emitted from the vehicle.

According to this embodiment of the present invention, a high-beam lamp chamber portion 2, a low-beam lamp chamber portion 3, a turnsignal lamp chamber portion 4 and a clearance lamp chamber portion 5 are provided. The roles and functions of the lamp chamber portions 2, 3, 4 and 5 in the automotive vehicle will not be described in detail herein as the roles and functions thereof are similar to those heretofore well known. As shown in FIG. 3, the clearance lamp chamber portion 5 is disposed within the turnsignal lamp chamber portion 4, and as shown in FIG. 2 the clearance lamp chamber portion 5 is overlapped with the bulb 4a of the turnsignal lamp chamber portion 4 as seen from the front. A description will now be given of an arrangement of the turnsignal lamp chamber portion 4 as a first lamp chamber portion and the clearance lamp chamber portion 5 as a second lamp chamber portion of the present invention.

When the bulb 4a of the turnsignal lamp chamber portion 4 is switched ON, the lens portion 4b turns luminous in yellow, whereas when the bulb 5a of the clearance lamp chamber portion 5 is switched ON, the lens portion 5b turns luminous in white. According to this embodiment of the present invention, the lens portions 4b and 5b are colorless and the bulbs 4a and 5a turn luminous in yellow and white respectively.

As shown in FIG. 2, the clearance lamp chamber portion 5 is disposed so as to laterally pass through the turnsignal lamp chamber portion 4. According to this embodiment of the present invention, the clearance lamp chamber portion 5 is arranged so as to pass through the substantially center portion between the top and bottom of the turnsignal lamp chamber portions 4 and also to cross over the inside of the turnsignal lamp chamber portion 4. In other words, according to this embodiment of the present invention, the vehicle lamp 1 can be so structured that the clearance lamp chamber portion 5 is supported at each of its ends at the outside of the lamp chamber of the turnsignal lamp chamber portion 4 and therefore the clearance lamp chamber portion 5 is securely supported in the vehicle lamp 1.

The bulb 4a of the turnsignal lamp chamber portion 4 is provided near the central part between the top and bottom of the turnsignal lamp chamber portions 4 and as shown in FIG. 2 the portion 5d of the clearance lamp chamber portion 5 projected into the turnsignal lamp chamber portion 4 is overlapped with the bulb 4a of the turnsignal lamp chamber portion 4. Aluminum is deposited on the exterior surface of the casing 5c of the clearance lamp chamber portion 5 in order to have the incident light reflected therefrom. The bulb 5a of the clearance lamp chamber portion 5 is disposed on the central side between the right and lefthand sides of and in the clearance lamp chamber portion 5 and at the outside of the turnsignal lamp chamber portion 4. Incidentally, according to this embodiment of the present invention, the lens portions 4b and 5b of the turnsignal lamp chamber portion 4 and the clearance lamp chamber portion 5 are formed so as to obliquely incline backwardly toward the lateral direction at the outer sides as seen from the front.

Figure 4:
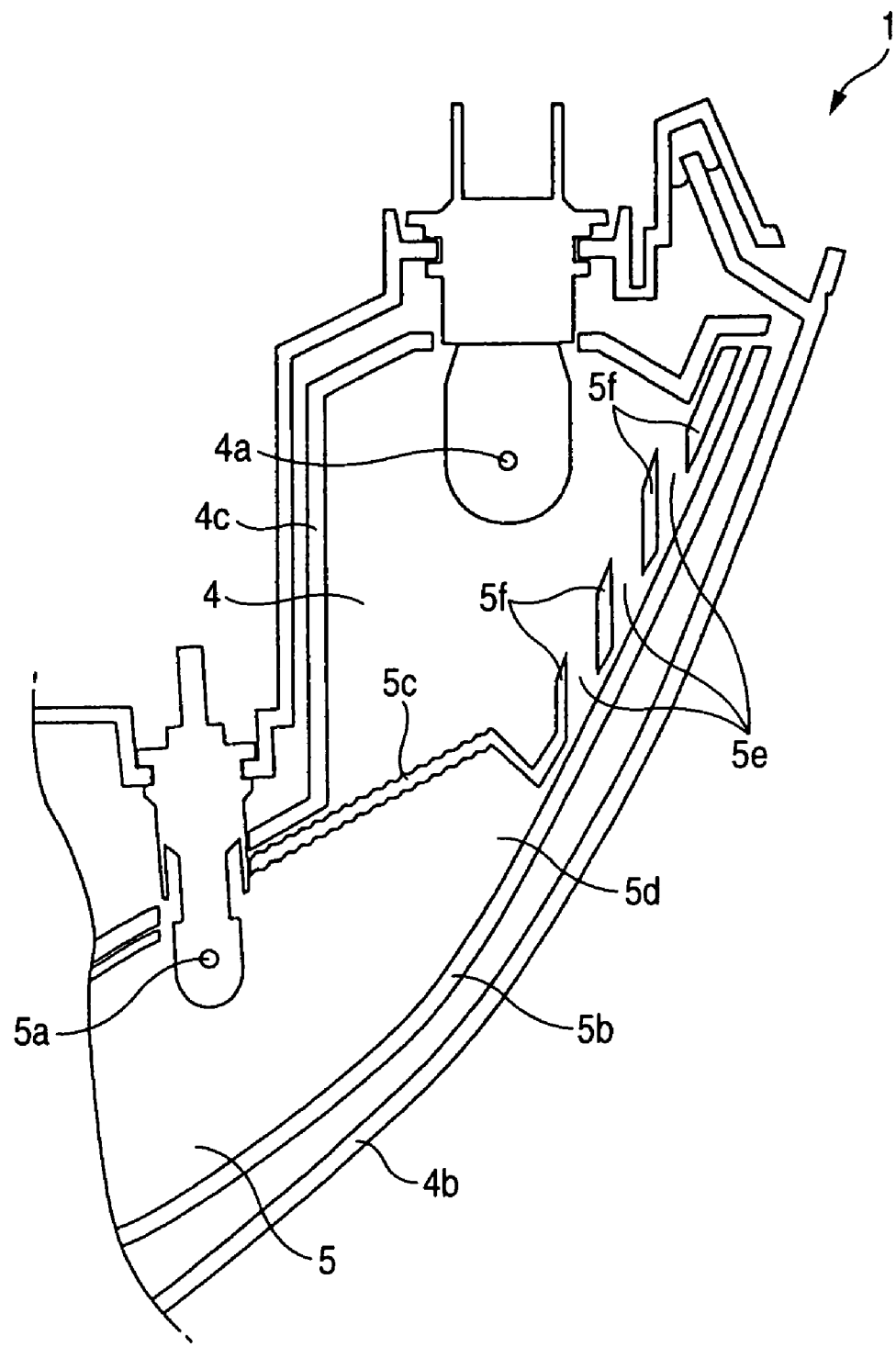
FIG. 4 is a sectional view of the top surface of the vehicle lamp.

As shown in FIG. 4, moreover, slits 5e are formed in the projected portion 5d of the clearance lamp chamber portion 5, so that the light within the turnsignal lamp chamber portion 4 is introduced into the clearance lamp chamber portion 5. According to this embodiment of the present invention, a plurality of slits 5e are provided on the laterally outer side of the casing 5c (on the right-hand side in FIG. 4) and each slit 5e is formed with side walls 5f extending in the substantially longitudinal direction. Thus, the light emitted from the bulb 4a is guided by the lens portion 5b when the bulb 4a of the turnsignal lamp chamber portion 4 is switched ON, whereby the lens portion 5b of the clearance lamp chamber portion 5 turns luminous in the color of the bulb 4a (yellow).

In this case, the lens portion 4b of the turnsignal lamp chamber portion 4 is wholly formed with a clear lens. The lens portion 5b of the clearance lamp chamber portion 5 includes the clear lens portions corresponding to the respective slits 5e and the rest of the clear lens portions are formed with a diffusion lens.

As shown in FIG. 3, projected shielding portions 5g are formed on the exterior surface of the casing 5c of the clearance lamp chamber portion 5. The projected shielding portion 5g is provided in the upper and lower portions of the casing 5c. According to this embodiment of the present invention, the upper and rear portion of the lens portion 5b and that of the casing 5c and the lower front portion of the lens portion 5b and that of the casing 5c are made substantially horizontal. Moreover, the upper and rear portion of the lens portion 5b and that of the casing 5c contact each other with the upper and rear portion of the lens portion 5b placed on the upper side, whereas the lower front portion of the lens portion 5b and that of the casing 5c also contact each other with the lower front portion of the lens portion 5b placed on the lower side. The projected shielding portion 5g is formed so as to project upwardly in the rear of the lens portion 5b in the upper and rear portion of the casing 5c, whereas the projected shielding portion 5g is formed so as to project downwardly in the rear of the lens portion 5b in the lower front portion of the casing 5c.

In the vehicle lamp 1 thus arranged, the space required for both the lamp chamber portions 4 and 5 can be made smaller than the space required for the lamp chamber portions 4 and 5 that are installed independently of each other by disposing the clearance lamp chamber portion 5 within the turnsignal lamp chamber portion 4.

As the clearance lamp chamber portion 5 is overlapped with the bulb 4a of the turnsignal lamp chamber portion 4, the bulb 4a remains invisible from the front side of the vehicle. In other words, the clearance lamp chamber portion 5 functions as not only a lamp chamber but also as covers for the bulb 4a of the turnsignal lamp chamber portion 4. Each of the slits 5e of the casing 5c of the clearance lamp chamber portion 5 is not overlapped with the bulb 4a of the turnsignal lamp chamber portion 4 as seen from the front, whereupon the bulb 4a is also invisible via each of the lens portions 4b and 5b from the front of the vehicle. Further, the side walls 5f of each slit 5e extend in the longitudinal direction, whereby the bulb 4a is invisible obliquely from the front of the vehicle. In other words, the bulb 4a is completely invisible from the outside of the vehicle through any one of the slits 5e of the casing 5c.

When the bulb 4a of the turnsignal lamp chamber portion 4 is switched ON with the bulb 5a of the clearance lamp chamber portion 5 being in the OFF state, a portion of the light emitted from the bulb 4a of the turnsignal lamp chamber portion 4 is obstructed by the clearance lamp chamber portion 5 and no light is directly incident on the projection part of the clearance lamp chamber portion 5 in the lens portion 4b of the turnsignal lamp chamber portion 4. As the light is reflected by the casing 4 of the turnsignal lamp chamber portion 4 into the lamp chamber, the reflected light is incident on the projection part. In other words, the light is incident on the whole lens portion 4b of the turnsignal lamp chamber portion 4 and the luminous condition of the whole lens portion 4b of the turnsignal lamp chamber portion 4 is visible from the outside of the vehicle.

When the bulb 5a of the clearance lamp chamber portion 5 is switched ON with the bulb 4a of the turnsignal lamp chamber portion 4 being in the OFF state, the light is incident on the lens portion 5b of the clearance lamp chamber portion 5. Therefore the luminous condition of the lens portion 5b of the clearance lamp chamber portion 5 is visible from the outside of the vehicle via the lens portion 4b of the turnsignal lamp chamber portion 4.

When the bulb 4a of the turnsignal lamp chamber portion 4 and the bulb 5a of the clearance lamp chamber portion 5 are switched ON, the whole lens portion 4b of the turnsignal lamp chamber portion 4 is made luminous by the light of the bulb 4a and the lens portion 5b of the clearance lamp chamber portion 5 is also made luminous by the light of the bulb 5a. Thus, the luminous condition of the lens portion 5b of the clearance lamp chamber portion 5 is visible from the outside of the vehicle via the lens portion 4b of the turnsignal lamp chamber portion 4.

When one or both of the lamp chamber portions 4 and 5 are made luminous, the lens portions 4b and 5b turn luminous.

When the bulb 4a of the turnsignal lamp chamber portion 4 is switched ON according to this embodiment of the present invention, the light emitted from the bulb 4a is incident on the lens portion 5b of the clearance lamp chamber portion 5 through each of the slits 5e. While the bulb 4a of the turnsignal lamp chamber portion 4 is in the ON state, a part of the lens portion 5b of the clearance lamp chamber portion 5 together with the lens portion 4b of the turnsignal lamp chamber portion 5 turns luminous.

In other words, when the bulb 4a of the turnsignal lamp chamber portion 4 and the bulb 5a of the clearance lamp chamber portion 5 are simultaneously switched ON according to this embodiment of the present invention, the whole lens portion 4b of the turnsignal lamp chamber portion 4 and the part of the lens portion 5b of the clearance lamp chamber portion 5 are made luminous by the bulb 4a of the turnsignal lamp chamber portion 4, whereas the other part of the lens portion 5b of the clearance lamp chamber portion 5 is made luminous by the bulb 5a of the clearance lamp chamber portion 5. At this time, as the slits 5e are formed in the substantially vertical direction of the casing 5c, the clear lens portions corresponding to the respective slits 5e of the lens portion 5b turn luminous vertically in the color of the turnsignal bulb 4a. In other words, though the lens portion 4b of the turnsignal lamp chamber portion 4 is divided by the clearance lamp chamber portion 5 into upper and low parts as seen from the front, the portions turning luminous in the color of the bulb 4a become visible consecutively in an integrated condition from the outside of the vehicle as the portions corresponding to the respective slits 5e of the lens portion 5b are made luminous by the bulb 4a.

When the bulb 5a of the clearance lamp chamber portion 5 is switched ON with the turnsignal lamp chamber portion 4 being in the OFF state, the whole lens portion 5b of the clearance lamp chamber portion 5 is made luminous in white by the light of the bulb 5a, whereas when the bulb 4a of the turnsignal lamp chamber portion 4 is switched ON with the clearance lamp chamber portion 5 being in the OFF state, the whole lens portion 4b of the turnsignal lamp chamber portion 4 is made luminous in yellow by the light of the bulb 4a as described above.

The light emitted from the bulb 4a of the turnsignal lamp chamber portion 4 toward the clearance lamp chamber portion 5 is reflected in the turnsignal lamp chamber portion 4 as the exterior surface of the casing 5c has been subjected to the surface treatment. In other words, the light emitted from the bulb 4a is never absorbed into the exterior surface of the clearance lamp chamber portion 5 as if the clearance lamp chamber portion 5 of which exterior surface is not subjected to such a surface treatment.

Furthermore, the exterior surface of the clearance lamp chamber portion 5 is to be reflected in the casing 4c of the turnsignal lamp chamber portion 4 with the turnsignal lamp chamber portion 4 being in the OFF state. However, as the exterior surface of the clearance lamp chamber portion 5 has been subjected to the surface treatment, the casing 4c of the turnsignal lamp chamber portion 4 is reflected therein. More specifically, the exterior surface of the clearance lamp chamber portion 5 with the casing 4c of the turnsignal lamp chamber portion 4 reflected on the exterior surface thereof is reflected in the casing 4c of the turnsignal lamp chamber portion 4, so that the inside of the casing 4c of the turnsignal lamp chamber portion 4 takes on an integral hue because the clearance lamp chamber portion 5 is not clearly visible from the outside of the vehicle.

Of the light emitted from the bulb 4a of the turnsignal lamp chamber portion 4, what is emitted toward the lens portion 5b of the clearance lamp chamber portion 5 is blocked by each of the projected shielding portions 5g from being incident on the lens portion 5b.

As the lens portion 4b of the turnsignal lamp chamber portion 4 is formed with the clear lens, the luminous condition of the lens portion 5b of the clearance lamp chamber portion 5 is clearly visible from the outside of the vehicle via the lens portion 5b of the clearance lamp chamber portion 5. Since at least the part of the lens portion 4b of the turnsignal lamp chamber portion 4 is formed with the diffusion lens, the irradiation range of the lens portion 5b is relatively wide to ensure that the luminous condition of the lens portion 5b of the clearance lamp chamber portion 5 is visible from the outside of the vehicle.

Further, the clearance lamp chamber portion 5 is securely supported at each of its ends at the outside of the lamp chamber of the turnsignal lamp chamber portion 4. As the clearance lamp chamber portion 5 is not supported by one end of the clearance lamp chamber portion disposed within the turnsignal lamp chamber portion 4, the clearance lamp chamber portion 5 is left in a stable condition.

With the vehicle lamp 1 thus arranged according to this embodiment of the present invention, as the clearance lamp chamber portion 5 is disposed within the lamp chamber of the turnsignal lamp chamber portion 4, it is easy to reduce the size of the vehicle lamp 1 as a whole by decreasing the space required for the lamp chamber portions 4 and 5 with the luminous area of the turnsignal lamp chamber portion 4 and that of the clearance lamp chamber portion 5 secured.

Consequently, the projection area of the vehicle also decreases as the projection areas in the light emitting directions decrease, and therefore improving the design freedom of shaping the vehicle from the aerodynamically design standpoint.

With the vehicle lamp 1 thus arranged according to this embodiment of the present invention, the luminous condition of the lens portion 5b of the clearance lamp chamber portion 5 is visible via the lens portion 4b of the turnsignal lamp chamber portion 4 when the bulb 4a of the turnsignal lamp chamber portion 4 and the bulb 5a of the clearance lamp chamber portion 5 turn luminous. Accordingly, it is possible to give the vehicle the esthetic shape.

With the vehicle lamp 1 thus arranged according to this embodiment of the present invention, as the clearance lamp chamber portion 5 is overlapped with the bulb 4a of the turnsignal lamp chamber portion 4, the bulb 4a of the turnsignal lamp chamber portion 4 is substantially covered by the clearance lamp chamber portion 5 whereby not only making the external appearance of the vehicle lamp favorable but also improving the sale value. The covering member of the bulb 4a of the turnsignal lamp chamber portion 4 can be omitted, which results in decreasing the number of parts. As the portion corresponding to the clearance lamp chamber portion 5 in the lens portion 4b of the turnsignal lamp chamber portion 4 is utilized as the luminous portion of the clearance lamp chamber portion 5, the whole lens portion 4b of the turnsignal lamp chamber portion 4 is also effectively utilized. In this case, as each of the slits 5e is not overlapped with the bulb 4a as seen from the front and formed to extend in the longitudinal direction, the bulb 4a is entirely invisible from the outside of the vehicle through any one of the slits 5e. Consequently, the provision of the slits 5e does not result in lowering the concealment of the bulb 4a.

With the vehicle lamp 1 thus arranged according to this embodiment of the present invention, as the exterior surface of the casing 5c of the clearance lamp chamber portion 5 has been subjected to the surface treatment, the light emitting efficiency of the lens portion 4b of the turnsignal lamp chamber portion 4 is prevented from being lowered because the light in the lamp chamber of the turnsignal lamp chamber portion 4 is absorbed by the clearance lamp chamber portion 5, so that the light emitted from the bulb 4a of the turnsignal lamp chamber portion 4 is effectively utilized.

Further, as the light is reflected from the exterior surface of the clearance lamp chamber portion 5, the shadow of the clearance lamp chamber portion 5 is not projected on the lens portion 4b of the turnsignal lamp chamber portion 4 when the bulb 4a of the turnsignal lamp chamber portion 4 is switched ON. Consequently, the lens portion 4b of the turnsignal lamp chamber portion 4 can be made luminous with substantially uniform luminosity and the clearance lamp chamber portion is not projected on (or toward) the casing 4c of the turnsignal lamp chamber portion 4 when the bulb 4a is switched OFF. The appearance of the vehicle lamp 1 can thus be improved while the bulb 4a of the turnsignal lamp chamber portion 4 is in the ON and OFF state.

With the vehicle lamp 1 thus arranged according to this embodiment of the present invention, of the light emitted from the bulb 4a of the turnsignal lamp chamber portion 4, as what is emitted toward the lens portion 5b of the clearance lamp chamber portion 5 is blocked by each of the projected shielding portions 5g from being incident on the lens portion 5b. The light of the bulb 4a of the turnsignal lamp chamber portion 4 is not directly incident on the lens portion 5b of the clearance lamp chamber portion 5, whereby the lens portion 5b of the clearance lamp chamber portion 5 is prevented from turning luminous when the bulb 4a of the turnsignal lamp chamber portion 4 is switched ON. In other words, the lens portion 5b of the clearance lamp chamber portion 5 is prevented from turning luminous when the bulb 4a of the turnsignal lamp chamber portion 4 is switched ON and the luminous condition of the lens portion 4b of the turnsignal lamp chamber portion 4 and that of the lens portion 5b of the clearance lamp chamber portion 5 are clearly distinguished from each other and also made visible accordingly.

With the vehicle lamp 1 thus arranged according to this embodiment of the present invention, when the turnsignal lamp chamber portion 4 is switched ON with the clearance lamp chamber portion 5 being in the OFF state, and on the other hand, the whole lens portion 4b or 5b of the lamp chamber portion 4 or 5 turns luminous, whereby the utilization of the luminous areas of the lens portions 4b and 5b are maximized and the visibility of each lens portion 4b or 5b can be improved.

With the vehicle lamp 1 thus arranged according to this embodiment of the present invention, the slits 5e are provided in the clearance lamp chamber portion 5 and when the lamp chamber portions 4 and 5 are in the ON state simultaneously, the part of the lens portion 5b of the clearance lamp chamber portion is made luminous by the bulb 4a of the turnsignal lamp chamber portion 4. Consequently, the luminous condition of the clearance lamp chamber portion 5 becomes different from the luminous condition assumed only when the clearance lamp chamber portion 5 is brought into the ON state, which results in easily noticeable, so that the visibility is improved further.

As the clearance lamp chamber portion 5 is allowed to be assumed that different luminous conditions in accordance with the luminous condition of the turnsignal lamp chamber portion 4, the design freedom of shaping the vehicle is noticeably improved and so is the sale value.

With the vehicle lamp 1 thus arranged according to this embodiment of the present invention, though the luminous portion of the lens portion 4b of the turnsignal lamp chamber portion 4 is divided by the luminous portion of the lens portion 5b of the clearance lamp chamber portion 5 into the parts, the turnsignal luminous portion in yellow is not divided by the clearance luminous portion in white into the parts by turning luminous part of the lens portion 5b of the clearance lamp chamber portion 5 so as to couple the divided luminous portion of the lens portion 4b of the turnsignal lamp chamber portion 4 when the turnsignal bulb 4a is switched ON. And this is very advantageous in practical use.

With the vehicle lamp 1 thus arranged according to this embodiment of the present invention, as the bulb 5a of the clearance lamp chamber portion 5 is not overlapped with the turnsignal lamp chamber portion 4, the wiring of the bulb 5a becomes long in order to draw around the outside of the turnsignal lamp chamber portion 4. Therefore, the wiring of the bulb 5a and the like are prevented from shielding or absorbing the light within the lamp chamber of the turnsignal lamp chamber portion 4. Thus, the function of the turnsignal lamp chamber portion 4 is not impeded.

With the vehicle lamp 1 thus arranged according to this embodiment of the present invention, as the clearance lamp chamber portion 5 is supported at each end, no load is applied repeatedly to the parts of supporting the clearance lamp chamber portion 5 even though the clearance lamp chamber portion 5 is excessively vibrated during the running condition of the vehicle, so that the reliability and durability of the clearance lamp chamber portion 5 can be improved. Accordingly, the clearance lamp chamber portion 5 is set free from deformation when used for a long time to ensure that the bulb 4a of the turnsignal lamp chamber portion 4 is covered up.

Incidentally, the vehicle lamp 1 has been shown as what is applicable to the headlights provided at the front end of the vehicle in the aforesaid embodiment of the present invention; however, the vehicle lamp may be applicable to tail lamps provided at the rear end of the vehicle, for example.

The clearance lamp chamber portion 5 has been shown as what is arranged within the lamp chamber of the turnsignal lamp chamber portion 4 in the aforesaid embodiment of the present invention; however, the turnsignal lamp chamber portion may be arranged within the lamp chamber of the clearance lamp chamber portion. In other words, operation/working-effect similar to what is mentioned in the aforesaid embodiment of the present invention is obtainable as long as at least the part of one lamp chamber portion is arranged within the lamp chamber of another lamp chamber portion in the lamp chamber portion.

The bulbs 4a and 5a have been shown as the light sources for use in the aforementioned embodiment of the present invention; however, any light source may be used as long as the light source operates to emit the light such as LED.

The casings 4c and 5c have been shown as those with aluminum deposited on their surfaces in the aforesaid embodiment of the present invention; however, the casing may be coated with silver paint for light-reflecting purposes.

The casing 5c of the clearance lamp chamber portion 5 has been shown as what has the exterior surface subjected to surface treatment for reflecting light in the aforesaid embodiment of the present invention; however, the casing 5c may be formed of the half-mirror. In this case, the half-mirror reflects light within the clearance lamp chamber portion 5 and passes through the light incident from the turnsignal lamp chamber portion 4. Thus, the light emitted from the bulb 4a of the turnsignal lamp chamber portion 4 is not impeded by the exterior surface of the casing 5c like the clearance lamp chamber portion 5 of which casing 5c is not formed of the half-mirror.

Therefore, the light emitted from the bulb 4a of the clearance lamp chamber portion 4 is effectively utilized without lowering the light emitting efficiency of the lens portion 5b of the clearance lamp chamber portion 5 because proceedings of the light within the lamp chamber of the turnsignal lamp chamber portion 4 is impeded by the clearance lamp chamber portion 5. In other words, the lens portion 4b of the turnsignal lamp chamber portion 4 can be made luminous with substantially uniform luminosity and the appearance of the vehicle lamp can be improved while the bulb 4a is in the ON state.

The lens portion 4b of the turnsignal lamp chamber portion 4 has been shown as what is divided by the lens portion 5b of the clearance lamp chamber portion 5 into upper and low parts as seen from the front; however, the lens portion 4b may be divided in any other directions or may not be divided. In addition, the specific detailed structure and the like may also be changed properly.

As set forth above in detail, the automotive vehicle lamp according to the present invention is designed so that the space required for the first lamp chamber portion and the second lamp chamber portion is reduced whereby to decrease the size of the whole vehicle lamp with the luminous area of each of the first and second lamp chamber portions secured. Consequently, the projection area of the vehicle decreases as the projection areas in the light emitting directions also decrease to improve the design freedom of shaping the vehicle, which results in making it convenient to shape the vehicle from the aerodynamic design standpoint.

Further, the luminous condition of the lens portion of the second lamp chamber portion is visible via the lens portion of the first lamp chamber portion when the light source of the first lamp chamber portion and that of the second lamp chamber portion turn luminous. Accordingly, it is possible to give the vehicle the esthetic shape.

The light source of the first lamp chamber portion is substantially covered by the second lamp chamber portion whereby to not only making the external appearance of the vehicle lamp favorable but also improving the sale value. The covering member of the light source of the first lamp chamber portion can be omitted, which results in decreasing the number of parts. As the portion corresponding to the second lamp chamber portion in the lens portion of the first lamp chamber portion is utilized as the luminous portion of the second lamp chamber portion, the whole lens portion of the first lamp chamber portion is effectively utilized.

The disclosure of Japanese Patent Application No. 2002-205416 filed on Jul. 15, 2002 including the specification, drawings and abstract is incorporated herein by reference in its entirety.

While the presently preferred embodiments of the present invention have been shown and described, it is to be understood that these disclosures are for the purpose of illustration and that various changes and modifications may be made without departing from the scope of the present invention as set forth in the appended claims.

What is claimed is:

1. A vehicle lamp comprising:
    first and second lamp chamber portions each including: a light source; a casing having an opening and a portion for reflecting a light emitted from the light source; and a lens portion for closing the opening; the first and second lamp chamber portions each forming a lamp chamber partitioned with the casing and the lens portion,
    wherein the lens portion of the first lamp chamber portion passes light through forwardly or backwardly from a vehicle;
    at least a part of the second lamp chamber portion disposed within the lamp chamber of the first lamp chamber portion; and
    the second lamp chamber portion overlapped with the light source of the first lamp chamber portion in the substantially longitudinal direction.

2. The vehicle lamp as set forth in claim 1, wherein
    a surface treatment for reflecting the light is applied on an exterior surface of the second lamp chamber portion facing to the light source of the first lamp chamber portion.

3. The vehicle lamp as set forth in claim 1, wherein
    the casing of the second lamp chamber portion is formed of a half-mirror.

4. The vehicle lamp as set forth in claim 1, wherein
    the lens portion of the first lamp chamber portion is formed of a clear lens, and at least said part of the lens portion of the second lamp chamber portion is formed of a diffusion lens for diffusing said light within the lamp chamber of the second lamp chamber portion.

5. The vehicle lamp as set forth in claim 2, wherein
    the lens portion of the first lamp chamber portion is formed of a clear lens, and at least said part of the lens portion of the second lamp chamber portion is formed of said diffusion lens for diffusing said light within the lamp chamber of the second lamp chamber portion.

6. The vehicle lamp as set forth in claim 3, wherein
    the lens portion of the first lamp chamber portion is formed of a clear lens, and at least said part of the lens portion of the second lamp chamber portion is formed of said diffusion lens for diffusing said light within the lamp chamber of the second lamp chamber portion.

7. The vehicle lamp as set forth in claim 1, wherein
    a projected shielding portion for obstructing a direct incidence of the light emitted from the light source of the first lamp chamber portion on the lens portion of the second lamp chamber portion is formed on the exterior surface of the second lamp chamber portion.

8. The vehicle lamp as set forth in claim 5, wherein
said projected shielding portion for obstructing said direct incidence of the light emitted from the light source of the first lamp chamber portion on the lens portion of the second lamp chamber portion is formed on the exterior surface of the second lamp chamber portion.

9. The vehicle lamp as set forth in claim 6, wherein
said projected shielding portion for obstructing said direct incidence of the light emitted from the light source of the first lamp chamber portion on the lens portion of the second lamp chamber portion is formed on the exterior surface of the second lamp chamber portion.

10. The vehicle lamp as set forth in claim 1, wherein
a slit for guiding the light emitted from the light source of the first lamp chamber portion to said part of the lens portion of the second lamp chamber portion is formed in the casing of the second lamp chamber portion.

11. The vehicle lamp as set forth in claim 8, wherein
a slit for guiding the light emitted from the light source of the first lamp chamber portion to said part of the lens portion of the second lamp chamber portion is formed in the casing of the second lamp chamber portion.

12. The vehicle lamp as set forth in claim 9, wherein
said slit for guiding the light emitted from the light source of the first lamp chamber portion to said part of the lens portion of the second lamp chamber portion is formed in the casing of the second lamp chamber portion.

13. The vehicle lamp as set forth in claim 1, wherein
the second lamp chamber portion is disposed so as to cross over the inside of the lamp chamber of the first lamp chamber portion.

14. The vehicle lamp as set forth in claim 11, wherein
the second lamp chamber portion is disposed so as to cross over the inside of the lamp chamber of the first lamp chamber portion.

15. The vehicle lamp as set forth in claim 12, wherein
the second lamp chamber portion is disposed so as to cross over the inside of the lamp chamber of the first lamp chamber portion.

* * * * *